US009059508B2

(12) United States Patent  
Worl et al.

(10) Patent No.: US 9,059,508 B2
(45) Date of Patent: Jun. 16, 2015

(54) CONFORMAL ACTIVE REFLECT ARRAY FOR CO-SITE AND MULTI-PATH INTERFERENCE REDUCTION

(71) Applicants: Robert T. Worl, Maple Valley, WA (US); Gary A. Ray, Issaquah, WA (US); Mark A. Curry, Lynnwood, WA (US)

(72) Inventors: Robert T. Worl, Maple Valley, WA (US); Gary A. Ray, Issaquah, WA (US); Mark A. Curry, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 218 days.

(21) Appl. No.: 13/647,589

(22) Filed: Oct. 9, 2012

(65) Prior Publication Data

US 2014/0097987 A1 Apr. 10, 2014

(51) Int. Cl.
  *G01S 13/48* (2006.01)
  *H01Q 1/28* (2006.01)
  *H01Q 1/52* (2006.01)
  *H01Q 3/26* (2006.01)
  *H01Q 3/46* (2006.01)

(52) U.S. Cl.
  CPC .............. *H01Q 1/287* (2013.01); *H01Q 1/52* (2013.01); *H01Q 3/2617* (2013.01); *H01Q 3/46* (2013.01)

(58) Field of Classification Search
  CPC ............ G01S 19/21; G01S 7/023; G01S 7/36
  USPC .................................. 342/159, 161–162, 368
  See application file for complete search history.

(56) References Cited

U.S. PATENT DOCUMENTS

| | | | | |
|---|---|---|---|---|
| 5,872,540 A | * | 2/1999 | Casabona et al. | 342/362 |
| 5,952,964 A | * | 9/1999 | Chan | 342/368 |
| 6,442,375 B1 | * | 8/2002 | Parmentier | 455/78 |
| 6,597,316 B2 | * | 7/2003 | Rao et al. | 343/700 MS |
| 6,650,271 B1 | * | 11/2003 | Simone et al. | 342/16 |
| 6,768,471 B2 | * | 7/2004 | Bostwick et al. | 343/853 |
| 7,253,769 B2 | * | 8/2007 | Leblond | 342/378 |
| 8,098,991 B2 | * | 1/2012 | DeSalvo et al. | 398/115 |
| 2002/0167440 A1 | * | 11/2002 | Baugh | 342/159 |
| 2003/0052825 A1 | * | 3/2003 | Rao et al. | 343/700 MS |
| 2013/0028298 A1 | * | 1/2013 | Manry et al. | 375/211 |

OTHER PUBLICATIONS

Tang Ziyue; Wang Yongliang; Zhu Minhui, "STAP in conformal phased array airborne radar," Radar, 2001 CIE International Conference on, Proceedings, vol., no., pp. 952,955, 2001.*

* cited by examiner

*Primary Examiner* — John B Sotomayor
*Assistant Examiner* — Marcus Windrich
(74) *Attorney, Agent, or Firm* — Ameh IP; Lowell Campbell; Elahe Toosi

(57) ABSTRACT

A system and methods for co-site and multi-path interference mitigation are presented. A reflection signal is received from at least one aircraft surface at a sensor near a receiver antenna, and a conformal reflective phased array antenna coupled to at least one aircraft surface is configured to steer the reflection signal. The reflection signal is steered using the conformal reflective phased array antenna to reduce an amplitude of the reflection signal at the receiver antenna based on the reflection signal received at the sensor.

32 Claims, 11 Drawing Sheets

CONFORMAL ACTIVE REFLECT ARRAY FOR CO-SITE AND MULTI-PATH INTERFERENCE REDUCTION

FIELD

Embodiments of the present disclosure relate generally to antennas. More particularly, embodiments of the present disclosure relate to interference reduction for antenna systems.

BACKGROUND

Co-site or multipath interference signals can interfere with expected signals at on-board receivers on a platform. If there is a co-site or multipath interference problem on a platform, possible solutions include turning systems off, moving antennas and systems, or complete redesign. Existing methods for reducing co-site interference and multipath interference generally change structures of the platform. If the co-site or multipath interference signals are caught too late in a project development cycle, major structural redesigns may be necessary. In particular, redesign can add too much weight to a vehicle and make other major compromises in an air frame or a radio frequency (RF) system.

In addition, these methods can reduce performance and add a considerable amount of weight to the platforms that may already be pushing limits of available capacity, and limit locations where receivers can be mounted on the platforms. Existing methods can involve exhaustive analysis and complex routines, and not every problem in this area has a solution that can be effectively analyzed. For example, due to the highly complex nature of modern Anti-Submarine Warfare (ASW) intelligence, surveillance and reconnaissance (ISR) (ASW/ISR) platforms, not all possible scenarios can be analyzed effectively.

SUMMARY

A system and methods for co-site and multi-path interference mitigation are presented. A reflection signal is received from at least one aircraft surface at a sensor near a receiver antenna, and a conformal reflective phased array antenna coupled to the aircraft surface is configured to steer the reflection signal. The reflection signal is steered using the conformal reflective phased array antenna to reduce an amplitude of the reflection signal at the receiver antenna based on the reflection signal received at the sensor.

In this manner, embodiments of the disclosure provide a conformal active reflective array system and method to mitigate co-site or multipath interference signal interference with expected signals at on-board receivers on a platform such as an aircraft. The conformal active reflective array system provided herein is lighter than existing RF absorber options, and does not require repositioning antennas.

In an embodiment, a method for co-site and multi-path interference mitigation receives a reflection signal from at least one aircraft surface at a sensor near a receiver antenna. The method further configures a conformal reflective phased array antenna coupled to at least one aircraft surface to steer the reflection signal. The method further steers the reflection signal using the conformal reflective phased array antenna to reduce an amplitude of the reflection signal at the receiver antenna based on the reflection signal received at the sensor.

In another embodiment, a co-site and multi-path interference mitigation system comprises a receiver antenna, a sensor, a conformal reflective phased array antenna, and a controller. The sensor is near the receiver antenna and is configured to receive a reflection signal from at least one aircraft surface. The conformal reflective phased array antenna is coupled to the at least one aircraft surface configured to steer the reflection signal. The controller is configured to steer the reflection signal using the conformal reflective phased array antenna to reduce an amplitude of the reflection signal at the receiver antenna based on the reflection signal received at the sensor.

In a further embodiment, a method for configuring a co-site and multi-path interference mitigation system configures a sensor near a receiver antenna, and couples a conformal reflective phased array antenna to at least one aircraft surface. The method further configures the conformal reflective phased array antenna to steer a reflection signal from at least one aircraft surface, and configures the sensor to receive the reflection signal. The method further configures a controller to steer the reflection signal using the conformal reflective phased array antenna to reduce an amplitude of the reflection signal at the receiver antenna based on the reflection signal received at the sensor.

In a further embodiment, a non-transitory computer readable storage medium comprises computer-executable instructions for performing co-site and multi-path interference mitigation. The computer-executable instructions receive a reflection signal from at least one aircraft surface at a sensor near a receiver antenna, and configure a conformal reflective phased array antenna coupled to at least one aircraft surface to steer the reflection signal. The computer-executable instructions further steer the reflection signal using the conformal reflective phased array antenna to reduce the amplitude of the reflection signal at the receiver antenna.

In a further embodiment, a method for space-time-adaptive-processing for actively forming and directing a radiation null at an on-board receiver to reduce a multipath interference signal from an off-board source computes angles of nulls of a nominal scatter field of a reflection signal. The method further determines a closest null to an angle of a receiver antenna, and steers the reflection signal using a conformal reflective phased array antenna to direct the closest null onto the receiver antenna based on the angle of the receiver.

In a further embodiment, a non-transitory computer readable storage medium comprising computer-executable instructions for performing space-time-adaptive-processing for actively forming and directing a radiation null at an on-board receiver to reduce a multipath interference signal from an off-board source. The computer-executable instructions compute angles of nulls of a nominal scatter field of a reflection signal, and determine a closest null to an angle of a receiver antenna. The computer-executable instructions further steers the reflection signal using a conformal reflective phased array antenna to direct the closest null onto the receiver antenna based on the angle of the receiver antenna.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without

DETAILED DESCRIPTION

Figure 1:
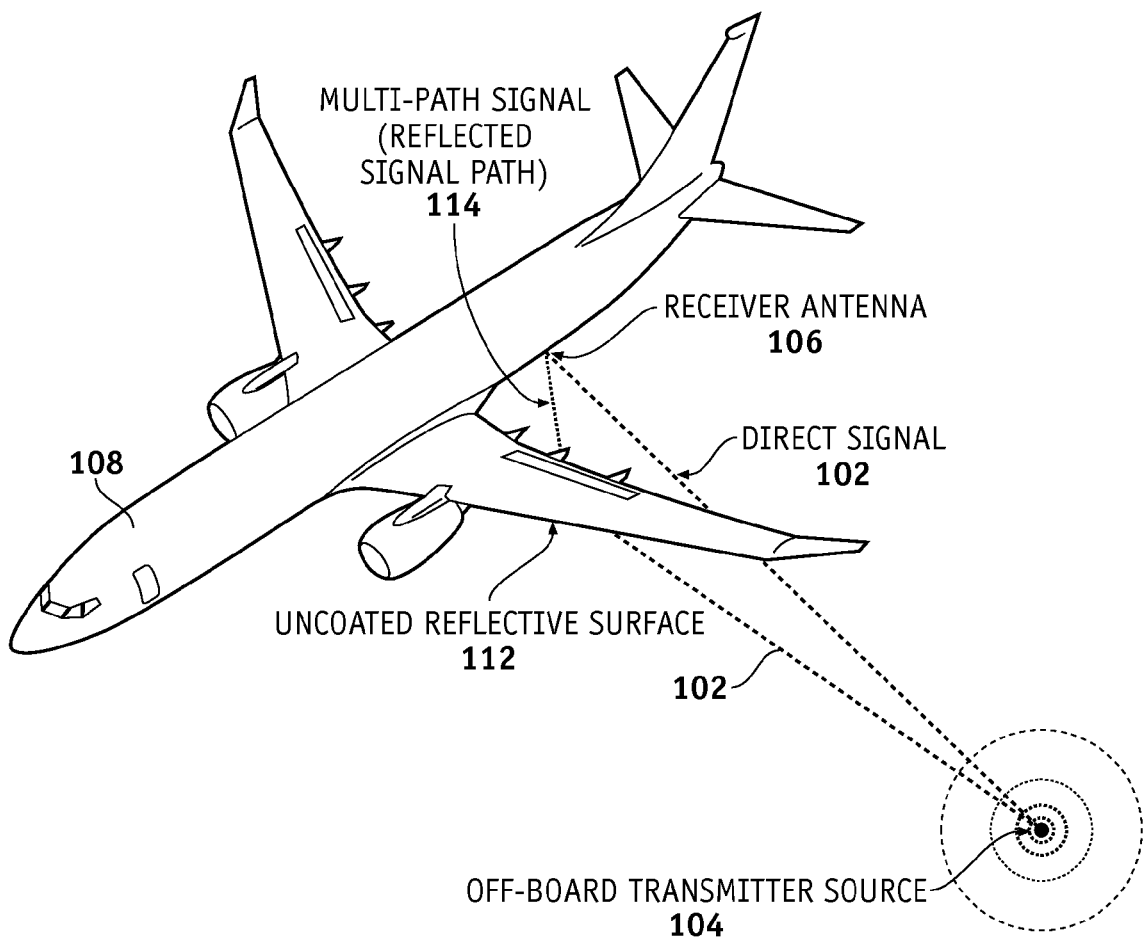
FIG. 1 is an illustration of an exemplary multi-path interference environment.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to antenna, antenna manufacturing, manufacturing design parameters, electronic circuits and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, a conformal antenna. Embodiments of the disclosure, however, are not limited to such conformal antenna applications, and the techniques described herein may also be utilized in other applications. For example but without limitation, embodiments may be applicable to a fractal antenna, a microelectromechanical systems controlled (MEMS-controlled) reflective surface, or other controllable reflective elements.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a way to mitigate interference after substantially all the systems and antennas are placed (in either a prototype or early production platform/vehicle). Thus the embodiments allow for after-the-fact mitigation, especially useful if the problem is not detected early in a design program. Also, the technology to implement the conformal active reflective array according to embodiments does not add substantial weight to the platform/vehicle, compared to some iron-based absorbers. Further, embodiments provide a method for altering existing fielded platforms and new platforms to have increased functionality and performance. The conformal active reflective array provided herein is lighter than the existing RF absorber option, and does not require repositioning antennas.

FIG. 1 is an illustration of an exemplary multi-path interference environment 100. A direct signal 102 emitted from an off-board transmitter source 104 is received at a receiver antenna 106 on board an aircraft 108. The direct signal 102 may be reflected of an uncoated reflective surface 112 of the aircraft 108 generating a delayed version of the direct signal 102 such as a multi-path signal 114. The multi-path signal 114 received at the receiver antenna 106 causes multi-path interference.

Figure 2:
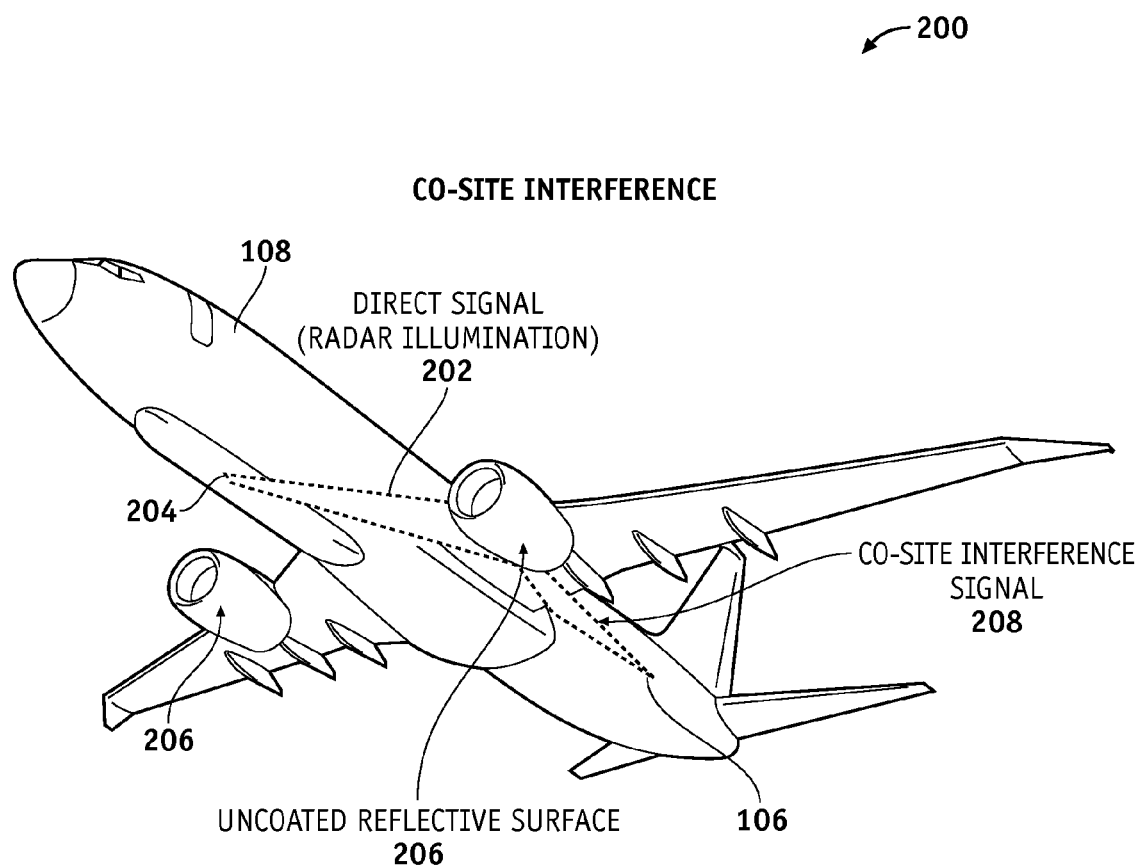
FIG. 2 is an illustration of an exemplary co-site interference environment.

FIG. 2 is an illustration of an exemplary co-site interference environment 200. A direct signal 202 emitted from an on-board transmitter source 204 is received at the receiver antenna 106 on board the aircraft 108. The direct signal 202 may be reflected off an uncoated reflective surface 206 of the aircraft 108 generating a co-site interference signal 208. The interference signal 208 received at the receiver antenna 106 causes co-site interference.

Figure 3:
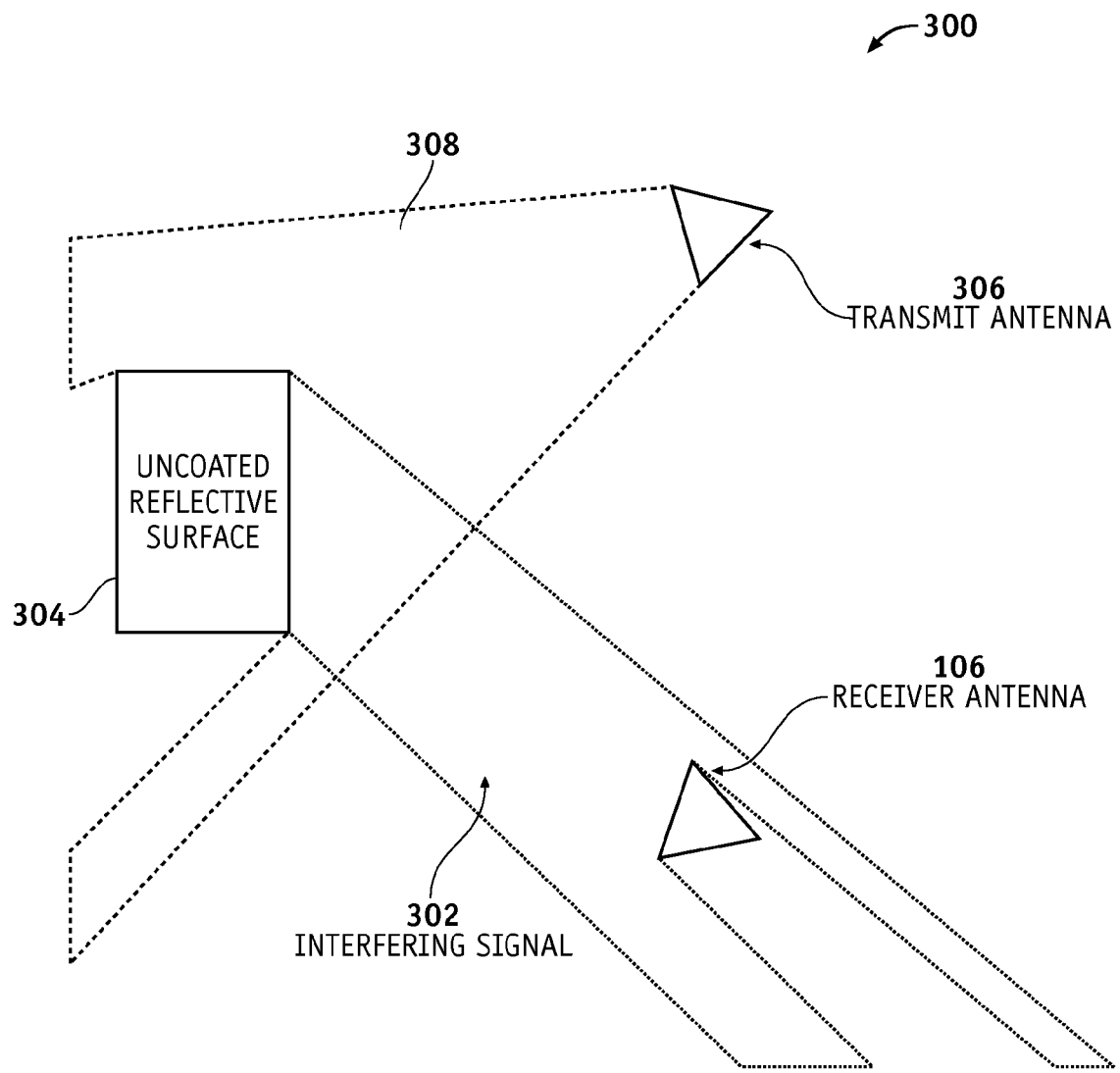
FIG. 3 is an illustration of an exemplary interfering signal reflected from an uncoated reflective surface showing an interfering signal is received at a receiver antenna.

FIG. 3 is an illustration of an exemplary interfering signal 302 reflected from an uncoated reflective surface 304 showing the interfering signal 302 is received at the receiver antenna 106. A transmit antenna 306 transmits a signal 308 that bounces off the uncoated reflective surface 304 generating the interfering signal 302. The transmit antenna 306 may comprise an on-board source such as the on-board transmitter source 204 and/or an off-board source such as the off-board transmitter source 104.

Figure 4:
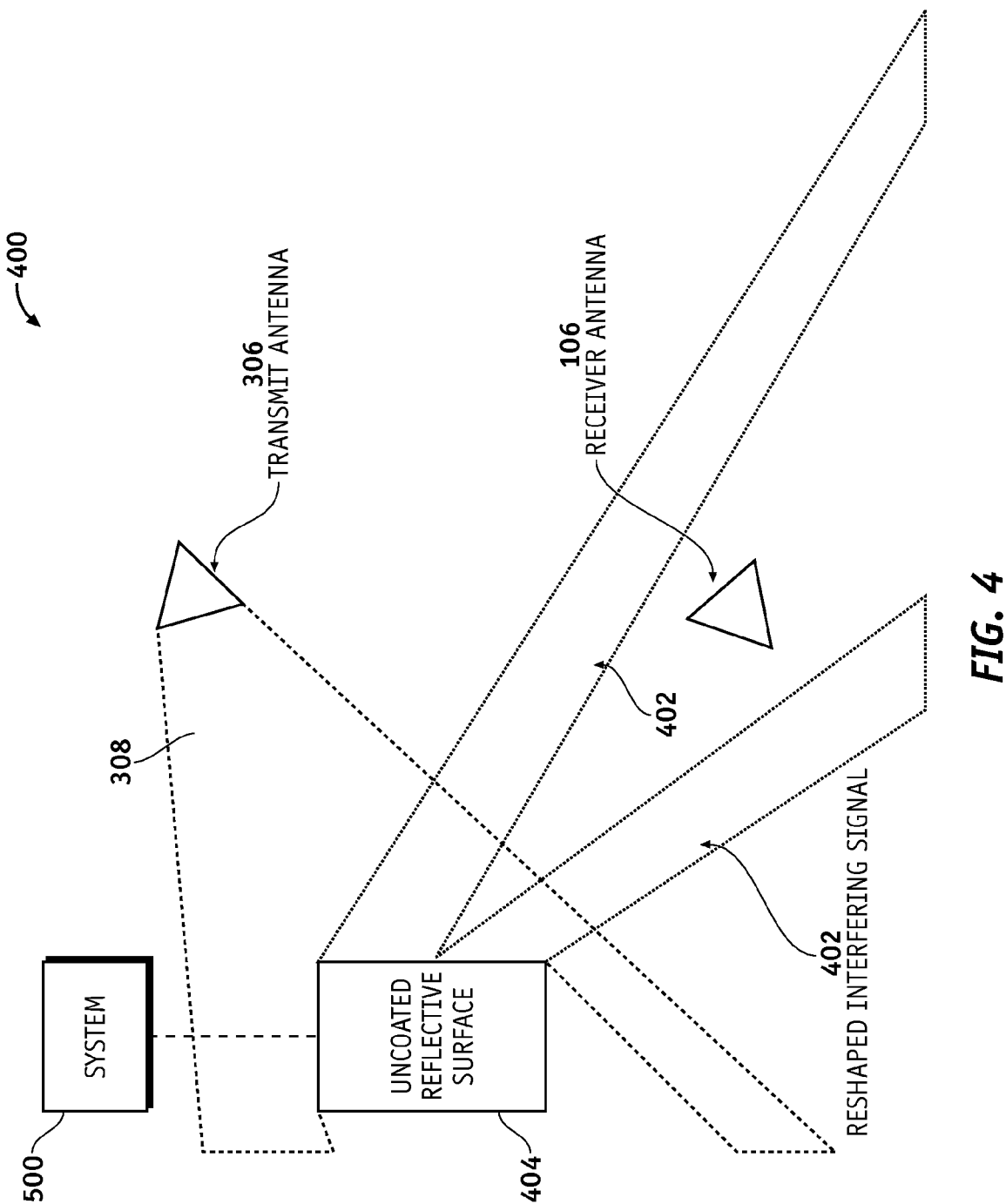
FIG. 4 is an illustration of an exemplary interfering signal reflected from a reflective-array-coated reflective surface showing an interfering signal is reshaped and not received at a receiver antenna according to an embodiment of the disclosure.

FIG. 4 is an illustration of an exemplary reshaped interfering signal 402 reflected from a reflective-array-coated reflective surface 404 showing a reshaped interfering signal 402 (reflection signal 402) is not received at the receiver antenna 106 according to an embodiment of the disclosure. The transmit antenna 306 transmits the signal 308 that bounces off the reflective-array-coated reflective surface 404 generating the reflection signal 402. The transmit antenna 306 may comprise an on-board source such as the on-board transmitter source 204 and/or an off-board source such as the off-board transmitter source 104. The reflection signal 402 is adjusted by a system 500, as explained in more detail in the context of discussion of FIG. 5, so that the reflection signal 402 does not reach the receiver antenna 106, thereby mitigating signal interference as explained in more detail below.

Figure 5:
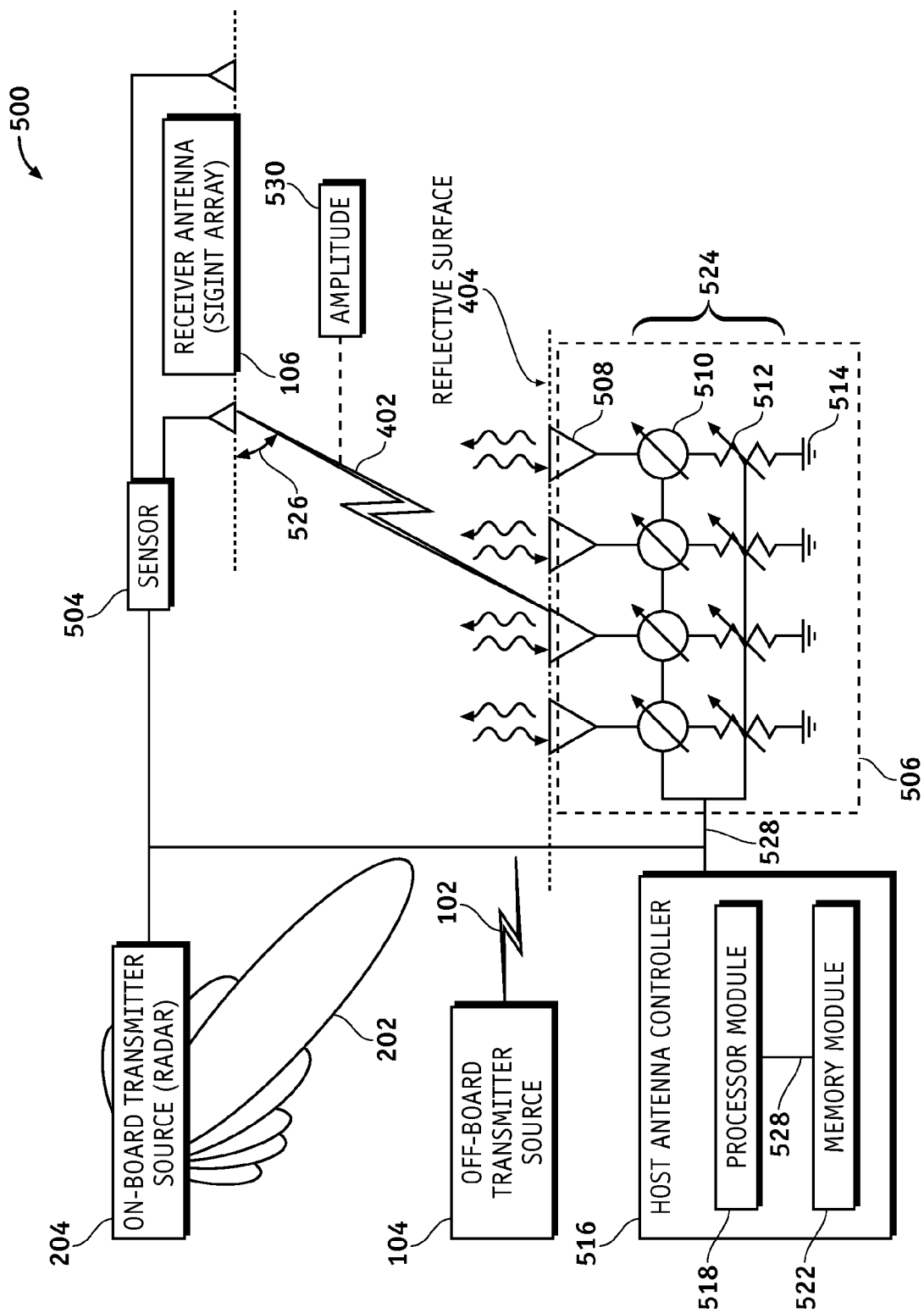
FIG. 5 is an illustration of an exemplary conformal active reflective array system for co-site and multipath interference reduction according to an embodiment of the disclosure.

FIG. 5 is an illustration of an exemplary conformal active reflective array system 500 (system 500) for co-site and multipath interference reduction according to an embodiment of the disclosure. System 500 may comprise elements such as: the receiver antenna 106 (FIG. 1), the on-board transmitter source 204 (FIG. 2), a sensor 504, a conformal reflective phased array antenna 506 (conformal active reflective array antenna 506), and a host antenna controller 516. An aircraft is used herein as an example of a platform, however other platforms such as, but without limitation, submarines, automobiles, spacecraft, Unmanned Arial Vehicles, and Unmanned Ground Vehicles, may also utilize the system 500. FIG. 5 may be described herein in conjunction with FIGS. 1-4 above.

The receiver antenna 106 is located on the aircraft 108 and is configured to receive the direct signal 102 emitted from the off-board transmitter source 104. The receiver antenna 106 may also receive interference from the reflection signal 402 reflected off at least one reflective-array-coated reflective surface 404 (aircraft surface 404). The receiver antenna 106 may comprise and/or be coupled to, for example but without limitation, a signal intelligence (SIGINT) array, or any other type of on-board receiver on-board the aircraft 108 that may interfere with the on-board transmitter source 204 and/or the off-board transmitter source 104.

The on-board transmitter source 204 is located on-board the aircraft 108 and is configured to transmit the direct signal 202. As explained above, the direct signal 202 may be reflected off the uncoated reflective surface 206 (FIG. 2) of the aircraft 108 generating the co-site interference signal 208 (FIG. 2) that may interfere with the receiver antenna 106. The co-site interference signal 208 and/or the multi-path signal 114 are reflected off the reflective-array-coated reflective surface 404 to generate the reflection signal 402. The reflection signal 402 is adjusted by the conformal reflective phased array antenna 506 so that the reflection signal 402 does not reach the receiver antenna 106, thereby mitigating signal interference.

The sensor 504 is located near the receiver antenna 106 and is configured to receive a reflection signal 402 from the reflective-array-coated reflective surface 404. The sensor 504 may determine whether the reflection signal 402 comprises an interference signal. The sensor 504 is configured to sense signal characteristics such as, but without limitation, received signal strength (RSSI) of the reflection signal 402, measured angle of arrival 526 (angle of the receiver 106) of the reflection signal 402 at the sensor 504, a frequency of the reflection signal 402, and/or other signal characteristics of the reflection signal 402. The sensor 504 sends the signal characteristics of the reflection signal 402 to the host antenna controller 516 in real-time or near real-time.

The conformal reflective phased array antenna 506 is coupled to at least one reflective-array-coated reflective surface 404 on the aircraft 108 and is configured to steer the reflection signal 402 to reduce an amplitude 530 of the reflection signal 402 at the receiver antenna 106 based on the reflection signal 402 received at the sensor 504. The conformal reflective phased array antenna 506 may comprise an antenna element 508, varactor diodes 524, a short circuit 514, or other circuits suitable for a conformal reflective phased array antenna. The conformal reflective phased array antenna 506 is coated on a surface as a reflective-array-coated surface. The conformal reflective phased array antenna 506 comprises a kind of a conformal reflective array known as a reflect-array which shapes a radiation that is reflected from its surface.

In operation, conformal reflective phased array antenna 506 steers the reflection signal 402 so that it does not interfere with the on-board receiver 106. In this manner, the system 500 is configured initially and adapted to changing conditions. Configuring system 500 is system-specific and may comprise at least one step for each of the elements of the system 500 described above. A method for configuring the system 500 is presented below in the context of discussion of FIG. 11.

Figure 6:
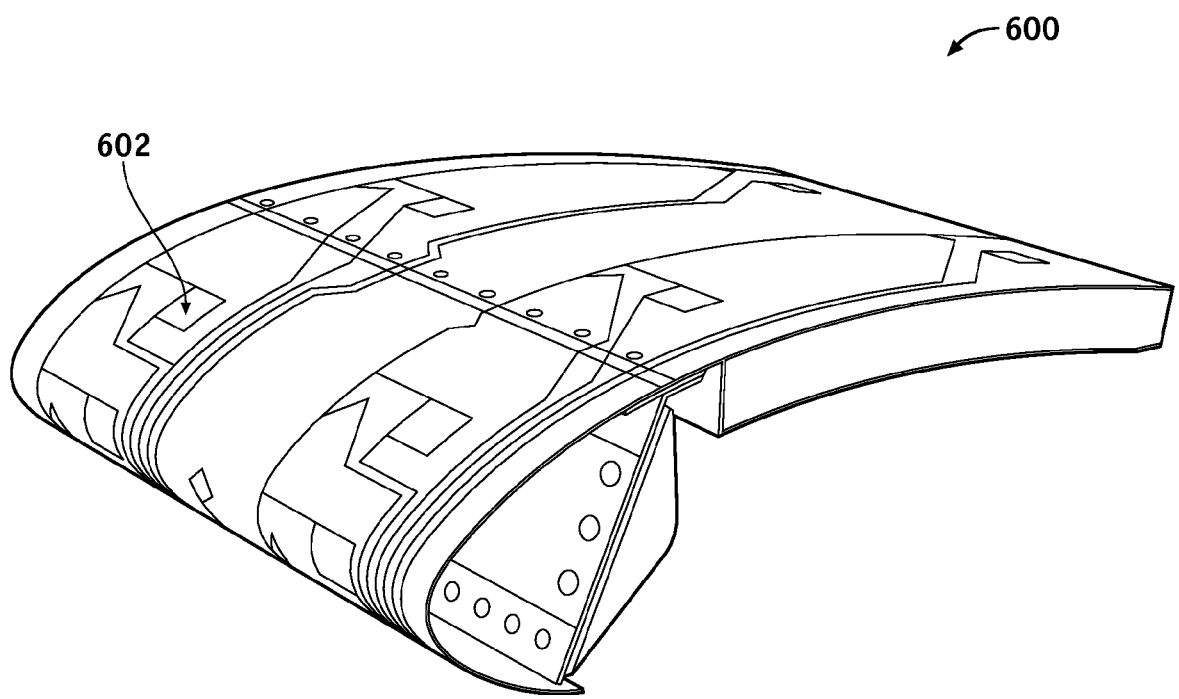
FIG. 6 is an illustration of an exemplary reflective-array-coated reflective surface showing a direct-write antenna element used to form a conformal reflective phased array antenna according to an embodiment of the disclosure.

The antenna element 508 is configured to control in real-time or near real-time the reflection signal 402 from the reflective-array-coated reflective surface 404, and to reduce reflection in a direction of the receiver antenna 106 based on characteristics of an interference signal such as the reflection signal 402 measured at the sensor 504. The antenna element 508 coats the uncoated reflective surface 304 to provide the reflective-array-coated reflective surface 404. The coating comprises flexible substrates and electronics (flexible substrate electronics) that conform to a curvature of the uncoated reflective surface 304. A flexible substrate/electronics process that forms a direct-write antenna element 602 as shown in FIG. 6 can be used to implement and apply the antenna element 508 to an uncoated surface on a platform such as the aircraft 108. The antenna element 508 may comprise, for example but without limitation, a direct-write circuitry, or other circuitry capable to conform to a shape of a surface for forming a conformal reflective phased array antenna such as the conformal reflective phased array antenna 506.

Each varactor diode 524 comprises a phase shifter 510 and an attenuator 512 and is configured to provide a continuous phase shift for steering the reflection signal 402. The phase shifter 510 is configured to change a phase of each antenna element 508 in response to a command from the host antenna controller 516 to provide phased array operation of the conformal reflective phased array antenna 506. The phase shifter 510 is further configured to change the phase of each antenna element 508 to steer the conformal reflective phased array antenna 506. The attenuator 512 is configured to control electromagnetic flux from each antenna element 508 to the short circuit 514.

The short circuit 514 is configured to provide a dipole ground of the antenna element 508 to a ground such as the reflection signal 402.

The host antenna controller 516 is configured to steer the reflection signal 402 using the conformal reflective phased array antenna 508 to reduce an amplitude of the reflection signal 402 at the receiver antenna 106 based on the reflection signal 402 received at the sensor 504. The host antenna controller 516 receives characteristics of the interference signal measured at the sensor 504 from the sensor 504.

In an embodiment, the host antenna controller 516 is configured to phase shift the reflection signal 402 based on the measured angle of arrival 526 of the reflection signal 402 at the sensor 504. In this manner, the host antenna controller 516 adjusts a phase shift of the phase shifter 510 to adjust where the reflection signal 402 is reflected from the reflective-array-coated surface 404 in order to reduce interference.

In another embodiment, the host antenna controller 516 uses the conformal reflective phased array antenna 506 to direct radiation (co-site interference signal 208) from the on-board transmitter source 204 away from receiver antennas such as the receiver antenna 106 to eliminate or reduce co-site interference and/or multi-path interference. The host antenna controller 516 is configured to phase shift the reflection signal 402 comprising the co-site interference signal 208 based on the measured angle of arrival 526 of the reflection signal 402 comprising the co-site interference signal 208 at the sensor 504. In this manner, the host antenna controller 516 adjusts a phase shift of the phase shifter 510 to adjust where the reflection signal 402 is reflected from the reflective-array-coated surface 404 to direct the reflection signal 402 comprising the co-site interference signal 208 away from the receiver antenna 106 to eliminate or reduce co-site interference and/or multi-path interference.

In another embodiment, the host antenna controller 516 uses the conformal reflective phased array antenna 506 and space-time-adaptive-processing (STAP) to actively form and direct radiation nulls (nulls) at specific on-board receivers to eliminate or reduce multi-path radiation from the off-board transmitter source 104 as explained in more detail below in the context of discussion of FIG. 7.

The host antenna controller 516 may comprise a processor module 518 and a memory module 522. In one embodiment, these and other elements of the host antenna controller 516 may be interconnected together via a communication link 528.

The processor module 518 comprises processing logic that is configured to carry out the functions, techniques, and processing tasks associated with the operation of the conformal active reflective array system 500. In particular, the processing logic is configured to support the conformal active reflective array system 500 described above.

The processor module 518 also accesses data stored in the memory module 522, to support functions of the conformal active reflective array system 500. Thereby, the processor module 518 enables method of co-site and multipath interference reduction of the conformal active reflective array system 500.

The processor module 518 may be implemented, or realized, with a general purpose processor, a content addressable, a digital signal processor, an application specific integrated circuit, a field programmable gate array, any suitable programmable logic device, discrete gate or transistor logic, discrete hardware components, or any combination thereof, designed to perform the functions described herein. In this manner, the processor module 518 may be realized as a microprocessor, a controller, a microcontroller, a state machine, or the like. The processor module 518 may also be implemented as a combination of computing devices, e.g., a combination of a digital signal processor and a microprocessor, a plurality of microprocessors, one or more microprocessors in conjunction with a digital signal processor core, or any other such configuration.

The processor module 518 may be comprised in, for example but without limitation, a desktop, a laptop or notebook computer, a hand-held computing device (e.g., PDA, cell phone, palmtop, etc.), a mainframe, a server, a client, or any other type of special or general purpose computing device as may be desirable or appropriate for a given application or environment. In some embodiments, the processor module 518 may comprise any number of processors, any number of memory modules, and any number of computational modules. The illustrated processor module 518 depicts a simple embodiment for ease of description. These and other elements of the processor module 518 are interconnected together, allowing communication between the various elements of the processor module 518.

Those of skill in the art will understand that the various illustrative blocks, modules, circuits, and processing logic described in connection with the embodiments disclosed herein may be implemented in hardware, computer-readable software, firmware, or a combination thereof. To illustrate clearly this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The various illustrative blocks, modules, processing logic, and circuits described in connection with the processor module 518 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The memory module 522 may be a data storage area with memory formatted to support the operation of the conformal active reflective array system 500. The memory module 522 is configured to store, maintain, and provide data as needed to support the functionality of the conformal active reflective array system 500 in the manner described herein. In some embodiments, the memory module 522 may comprise, for example but without limitation, a non-volatile storage device (e.g., non-volatile semiconductor memory, hard disk device, optical disk device, and the like), a random access storage device (e.g., SRAM, DRAM, etc.), or any other form of storage medium known in the art.

The memory module 522 may be coupled to the processor module 518 and configured to store the data suitable for partition of the system 500. The data may comprise, for example but without limitation, the measured angle of arrival 526, RSSI, a signal phase, angle of nulls of the reflected signal, angle of the receiver antenna 106, amplitude 430 of the reflection signal 402, or other data. Additionally, the memory module 522 may represent a dynamically updating database containing a table for updating the data in various databases. The memory module 522 may also store, a computer program that is executed by the processor module 518, an operating system, an application program, tentative data used in executing a program, or other application.

The memory module 522 may be coupled to the processor module 518 such that the processor module 518 can read information from and write information to the memory module 522. As an example, the processor module 518 and memory module 522 may reside in respective application specific integrated circuits (ASICs). The memory module 522 may also be integrated into the processor module 518. In an embodiment, the memory module 522 may comprise a cache memory for storing temporary variables or other intermediate information during execution of instructions to be executed by the processor module 518.

FIG. 6 is an illustration of an exemplary reflective-array-coated reflective surface 600 (similar to 404 in FIGS. 4 and 5) showing a direct-write antenna element 602 used to form a conformal reflective phased array antenna according to an embodiment of the disclosure. The direct-write antenna element 602 comprises direct write circuitry formed by a direct write process that can be used as the antenna element 508 to coat the uncoated reflective surface 304. The antenna element 508 can be coated on a surface such as the uncoated reflective surface 304 by the direct write process. Other flexible substrates/electronics can be used as a conformal reflect array (2-d conformal reflect array) to form the reflective-array-coated reflective surface 404/600 comprising the antenna element 508.

Figure 7:
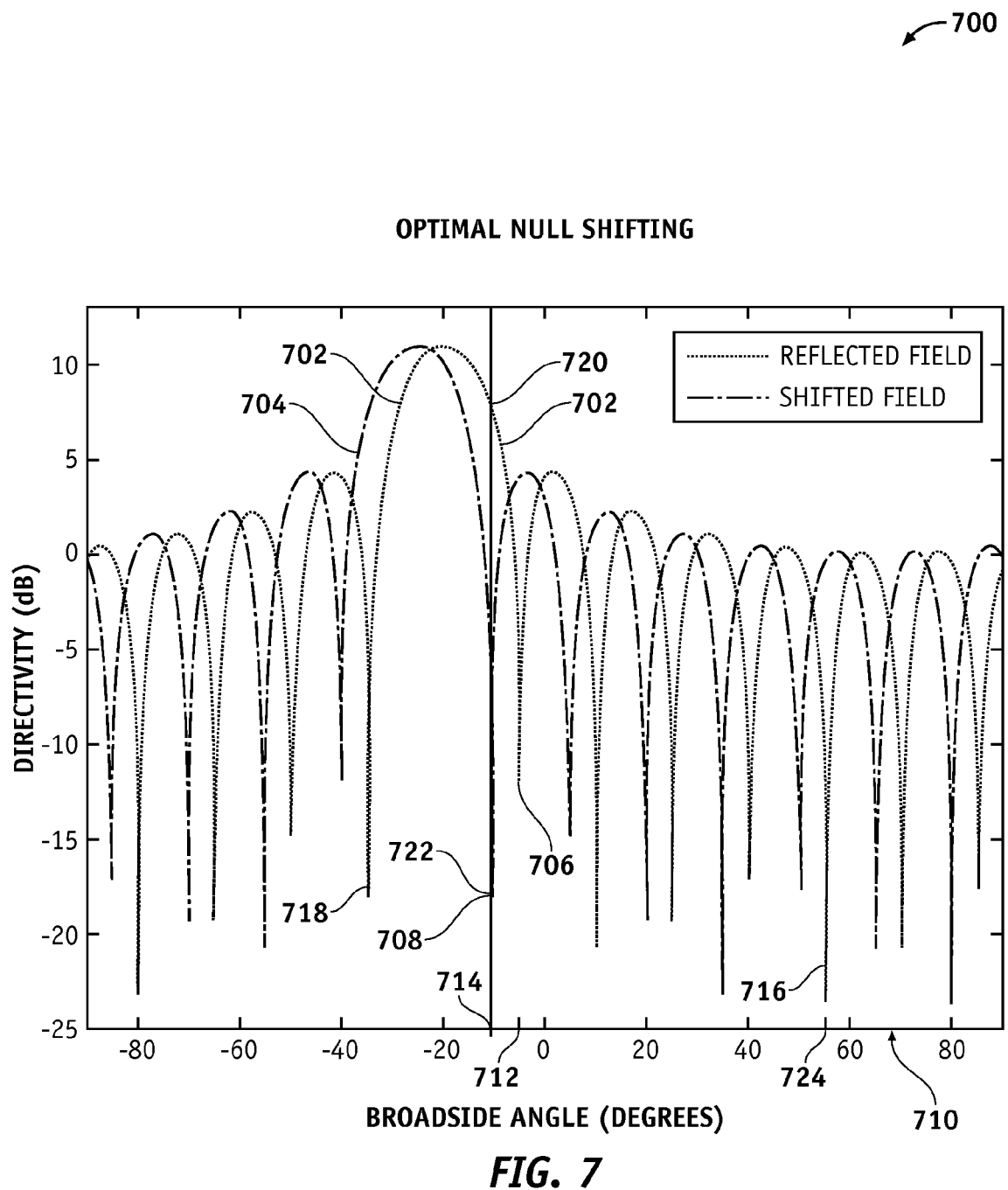
FIG. 7 is an illustration of an exemplary graph showing an optimal null shifting according to an embodiment of the disclosure.

FIG. 7 is an illustration of an exemplary graph showing an optimal null shifting 700 according to an embodiment of the disclosure. FIG. 7 shows directivity in dB vs. broadside angle (angle 710) in degrees for the conformal active reflect array antenna 506. FIG. 7 shows a reflected field 702 of the reflection signal 402 for the conformal active reflect array antenna 506 comprising twelve of the antenna elements 508. Increasing a number of the antenna elements 508 adds more degrees of freedom (nulls).

The reflected field 702 comprises a directivity 720 (e.g., about 8 dB) at an angle 714 of the receiver antenna 106. The reflected field 702 (nominal scatter field) of the reflection signal 402 is shifted to provide a shifted field 704. The reflected field 702 (nominal scatter field) of the reflection signal 402 is shifted by a difference in an angle 712 to the angle 714. By shifting the reflected field 702 to the shifted field 704, a null 706 at the angle 712 is shifted to become a shifted null 708 at the angle 714 of the receiver antenna 106.

The shifted field 704 comprises a directivity 722 (e.g., about −17 dB) at the shifted null 708 at the angle 714 to the receiver antenna 106. A difference (e.g., about 25 dB) between the directivity 720 of the reflected field 702 and the directivity 722 of the shifted field 704 reduces an amplitude of the reflection signal 402 at the receiver antenna 106.

The host antenna controller 516 steers the reflection signal 402 using the conformal reflective phased array antenna 508 to direct the null 706 of the reflection signal 402 at the receiver antenna 106 at the angle 714.

The host antenna controller 516 computes one or more angles 710 of one or more nulls 706/716/718 of the reflection signal 402, and determines a closest null such as the null 706 to the angle 714 of the receiver antenna 106. The angle 714 of the receiver antenna 106 may be determined based on signals 402 received at the sensor 504. The signals received at the sensor 504 may comprise measured signals measured at the sensor 504. The closest null may be determined based on comparing each of the angles 710 of each of the nulls 706/716/718 to the measured angle of arrival 526 of the reflection signal 402 at the sensor 504. The host antenna controller 516 then steers the reflection signal 402 using the conformal reflective phased array antenna 508 to direct the closest null 706 onto the receiver antenna 106.

In some embodiments, a shift may be made to a global minimum of directivity such as the null 716 at an angle 724 with a directivity of about −23 dB.

Figure 8:
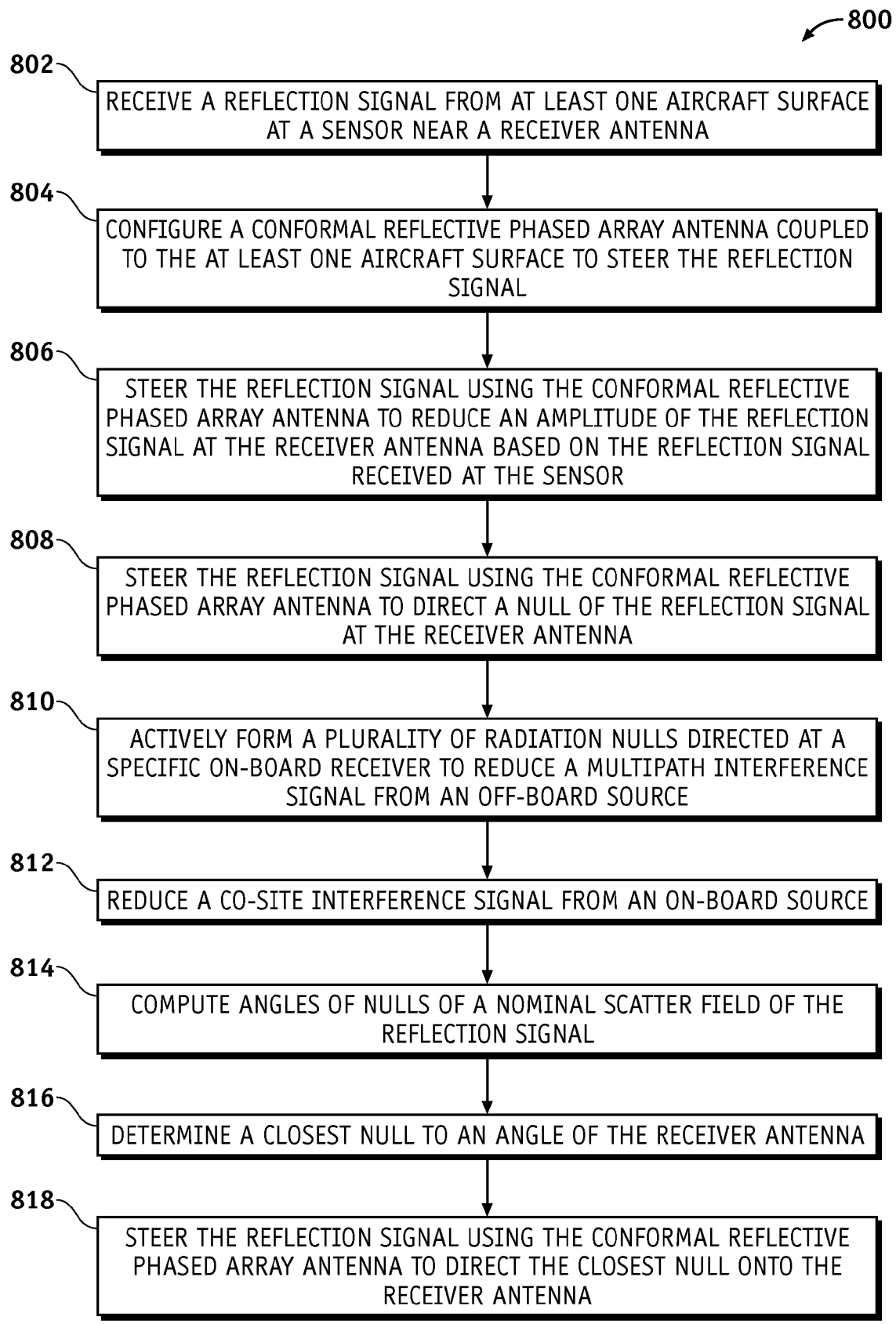
FIG. 8 is an illustration of an exemplary flowchart showing a process for co-site and multi-path interference mitigation according to an embodiment of the disclosure.

FIG. 8 is an illustration of an exemplary flowchart showing a process 800 for co-site and multi-path interference mitigation according to an embodiment of the disclosure. The various tasks performed in connection with process 800 may be performed mechanically, by software, hardware, firmware, or any combination thereof. It should be appreciated that process 800 may include any number of additional or alternative tasks, the tasks shown in FIG. 8 need not be performed in the illustrated order, and the process 800 may be incorporated into a more comprehensive procedure or process having additional functionality not described in detail herein.

For illustrative purposes, the following description of process 800 may refer to elements mentioned above in connection with FIGS. 1-4. In some embodiments, portions of the process 800 may be performed by different elements of the system 500 such as: the receiver antenna 106, the sensor 504, the conformal reflective phased array antenna 506, and the host antenna controller 516, etc. The process 800 may have functions, material, and structures that are similar to the embodiments shown in FIG. 5. Therefore common features, functions, and elements may not be redundantly described here.

Process 800 may begin by receiving a reflection signal such as the reflection signal 402 from at least one aircraft surface such as the reflective-array-coated reflective surface 404 at a sensor such as the sensor 504 near a receiver antenna such as the receiver antenna 106 (task 802).

Process 800 may continue by configuring a conformal reflective phased array antenna such as the conformal reflective phased array antenna 506 coupled to the at least one aircraft surface such as the reflective-array-coated reflective surface 404 to steer the reflection signal 402 (task 804).

Process 800 may continue by steering the reflection signal 402 using the conformal reflective phased array antenna 506 to reduce an amplitude such as the amplitude 530 of the reflection signal 402 at the receiver antenna 106 based on the reflection signal 402 received at the sensor 504 (task 806).

Process 800 may continue by steering the reflection signal 402 using the conformal reflective phased array antenna 506 to direct a null such as the null 706 of the reflection signal 402 at the receiver antenna 106 (task 808).

Process 800 may continue by actively forming and directing a plurality of radiation nulls such as the nulls 706/716/718 at a specific on-board receiver such as the receiver antenna 106 to reduce a multipath interference signal such as the multi-path signal 114 from an off-board source such as the off-board transmitter source 104 (task 810).

Process 800 may continue by reducing a co-site interference signal from an on-board source such as the co-site interference signal 208 (task 812).

Process 800 may continue by computing angles of nulls such as the angles 710 of a nominal scatter field such as the reflected field 702 of the reflection signal 402 (task 814).

Process 800 may continue by determining a closest null such as the null 706 to an angle such as the angle 714 of the receiver antenna 106 (task 816).

Process 800 may continue by steering the reflection signal 402 using the conformal reflective phased array antenna 506 to direct the closest null onto the receiver antenna 106 (task 818).

Figure 9:
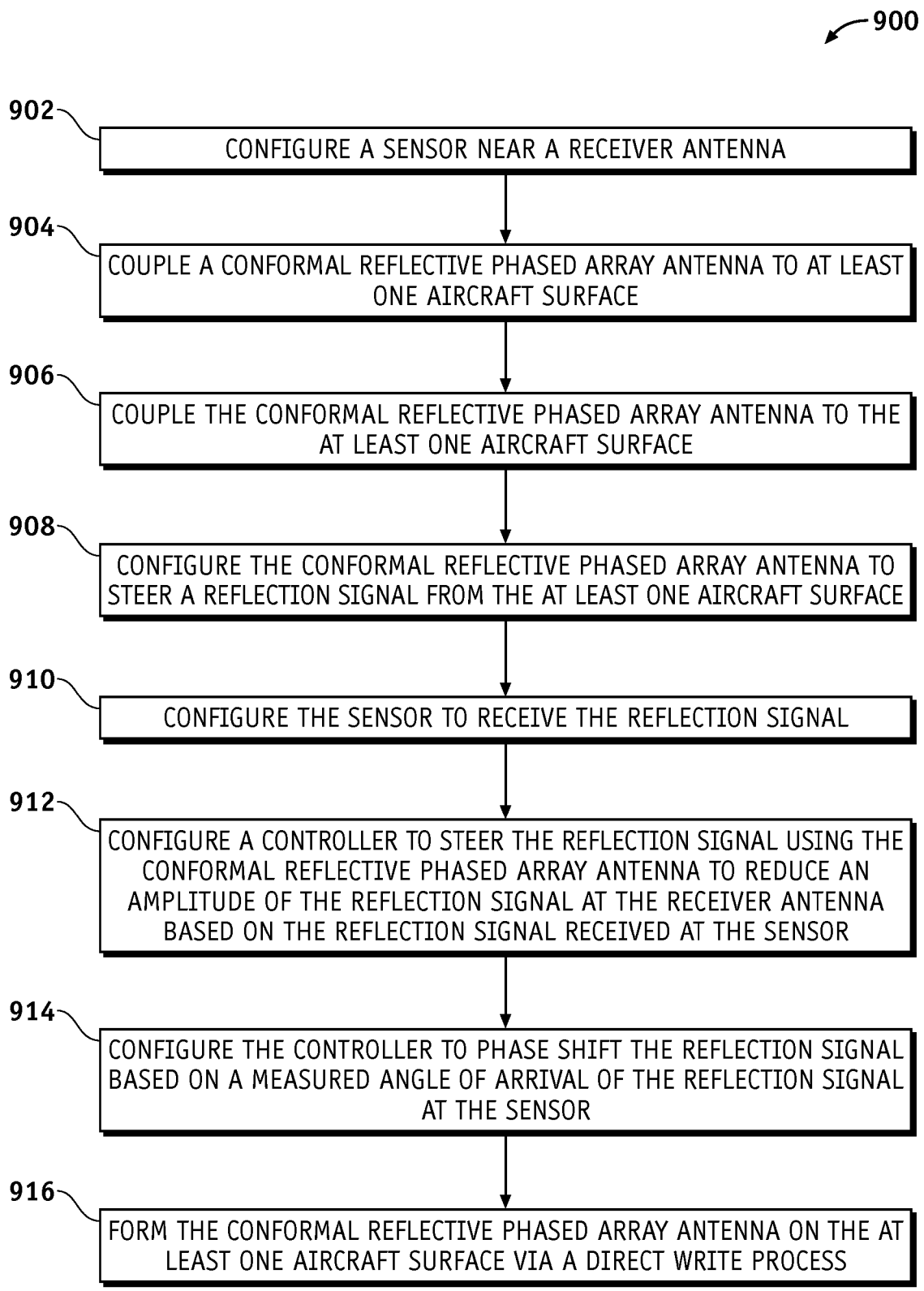
FIG. 9 is an illustration of an exemplary flowchart showing a process for configuring a co-site and multi-path interference mitigation system according to an embodiment of the disclosure.

FIG. 9 is an illustration of an exemplary flowchart showing a process 900 for configuring a co-site and multi-path interference mitigation system according to an embodiment of the disclosure. The various tasks performed in connection with process 900 may be performed mechanically, by software, hardware, firmware, or any combination thereof. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

For illustrative purposes, the following description of process 900 may refer to elements mentioned above in connection with FIGS. 1-6. In some embodiments, portions of the process 900 may be performed by different elements of the system 500 such as: the receiver antenna 106, the sensor 504, the conformal reflective phased array antenna 506, the host antenna controller 516, etc. The process 900 may have functions, material, and structures that are similar to the embodiments shown in FIG. 5. Therefore common features, functions, and elements may not be redundantly described here.

Process 900 may begin by configuring a sensor such as the sensor 504 near a receiver antenna such as the receiver antenna 106 (task 902).

Process 900 may continue by coupling a conformal reflective phased array antenna such as the conformal reflective phased array antenna 506 to at least one aircraft surface such as the reflective-array-coated reflective surface 404 (task 904).

Process 900 may continue by coupling the conformal reflective phased array antenna 506 to the at least one aircraft surface such as the reflective-array-coated reflective surface 404 (task 906).

Process 900 may continue by configuring the conformal reflective phased array antenna 506 to steer a reflection signal such as the reflection signal 402 from the at least one aircraft surface such as the reflective-array-coated reflective surface 404 (task 908).

Process 900 may continue by configuring the sensor 504 to receive the reflection signal 402 (task 910).

Process 900 may continue by configuring a controller such as the host antenna controller 516 to steer the reflection signal using the conformal reflective phased array antenna to reduce an amplitude such as the amplitude 530 of the reflection signal at the receiver antenna based on the reflection signal received at the sensor (task 912).

Process 900 may continue by configuring the controller to phase shift the reflection signal based on a measured angle of arrival such as the such as the host antenna controller 516 of the reflection signal 402 at the sensor 504 (task 914).

Process 900 may continue by forming the conformal reflective phased array antenna 506 on the at least one aircraft surface such as the reflective-array-coated reflective surface 404 via a direct write process (task 916).

Figure 10:
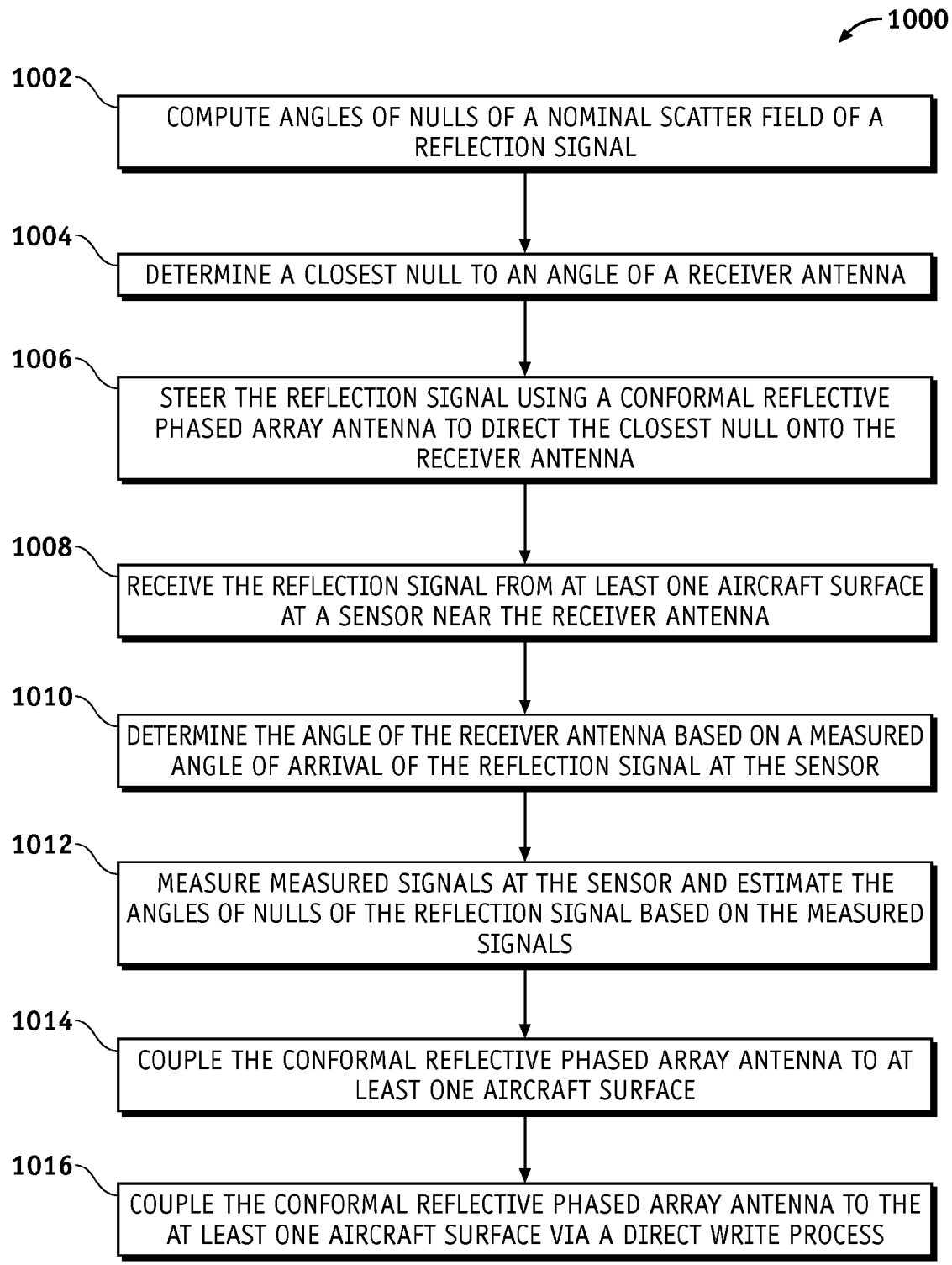
FIG. 10 is an illustration of an exemplary flowchart showing a process for space-time-adaptive-processing (STAP) to actively form and direct radiation nulls at specific on-board receivers to eliminate or reduce multi-path radiation from off-board sources according to an embodiment of the disclosure.

FIG. 10 is an illustration of an exemplary flowchart showing a process 1000 for space-time-adaptive-processing (STAP) to actively form and direct radiation nulls at specific on-board receivers to eliminate or reduce multi-path radiation from off-board sources according to an embodiment of the disclosure. The various tasks performed in connection with process 1000 may be performed mechanically, by software, hardware, firmware, or any combination thereof. It should be appreciated that process 1000 may include any number of additional or alternative tasks, the tasks shown in FIG. 10 need not be performed in the illustrated order, and the process 1000 may be incorporated into a more comprehensive procedure or process having additional functionality not described in detail herein.

For illustrative purposes, the following description of process 1000 may refer to elements mentioned above in connection with FIGS. 1-10. In embodiments, portions of the process 1000 may be performed by different elements of the system 500 such as: the receiver antenna 106, the sensor 504, the conformal reflective phased array antenna 506, and the host antenna controller 516, etc. The process 1000 may have functions, material, and structures that are similar to the embodiments shown in FIG. 5. Therefore common features, functions, and elements may not be redundantly described here.

Process 1000 may begin by computing angles such as the angles 710 of nulls such as the nulls 706/716/718 of a nominal scatter field such as the reflected field 702 of a reflection signal such as the reflection signal 402 (task 1002).

Process 1000 may continue by determining a closest null such as the null 706 to an angle such as the angle 714 of a receiver antenna such as the receiver antenna 106 (task 1004).

Process 1000 may continue by steering the reflection signal 402 using a conformal reflective phased array antenna such as the conformal reflective phased array antenna 506 to direct the closest null onto the receiver antenna 106 (task 1006).

Process 1000 may continue by receiving the reflection signal 402 from at least one aircraft surface such as the reflective-array-coated reflective surface 404 at a sensor such as the sensor 504 near the receiver antenna 106 (task 1008).

Process 1000 may continue by determining the angle 714 of the receiver antenna 106 based on a measured angle of arrival such as the measured angle of arrival 526 of the reflection signal 402 at the sensor 504 (task 1010).

Process 1000 may continue by measuring measured signals such as the reflection signal 402 at the sensor 504 and estimating angles of nulls such as the angles 710 of the nulls 706/716/718 of the reflection signal 402 based on the measured signals such as the reflection signal 402 (task 1012).

Process 1000 may continue by coupling the conformal reflective phased array antenna to at least one aircraft surface such as the reflective-array-coated reflective surface 404 (task 1014).

Process 1000 may continue by coupling the conformal reflective phased array antenna 506 to the at least one aircraft surface such as the reflective-array-coated reflective surface 404 via a direct write process (task 1016).

Figure 11:
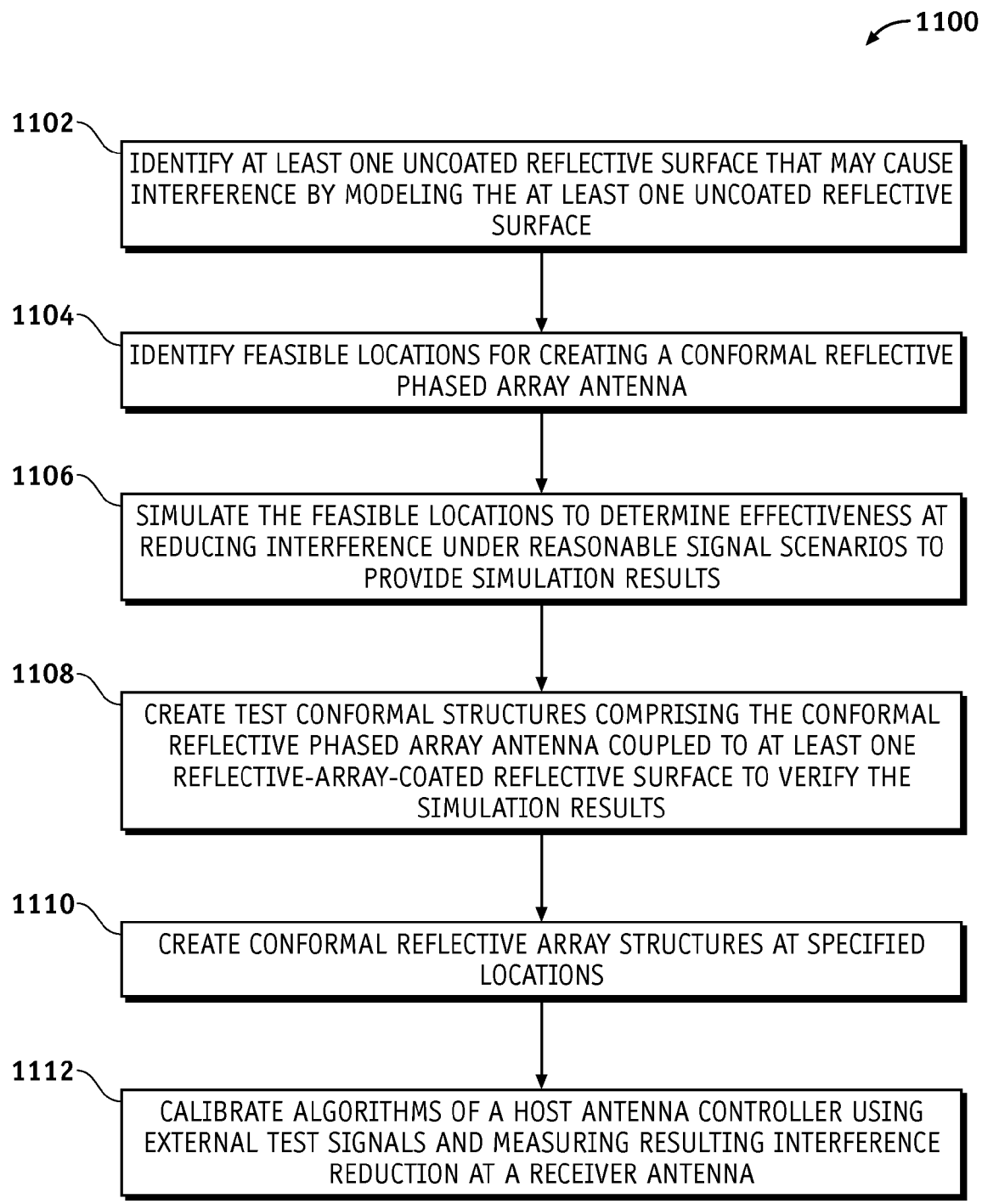
FIG. 11 is an illustration of an exemplary flowchart showing a process for configuring a co-site and multi-path interference mitigation system according to an embodiment of the disclosure.

FIG. 11 is an illustration of an exemplary flowchart showing a process 1100 for configuring a co-site and multi-path interference mitigation system according to an embodiment of the disclosure. The various tasks performed in connection with process 1100 may be performed mechanically, by software, hardware, firmware, or any combination thereof. It should be appreciated that process 1100 may include any number of additional or alternative tasks, the tasks shown in FIG. 11 need not be performed in the illustrated order, and the process 1100 may be incorporated into a more comprehensive procedure or process having additional functionality not described in detail herein.

For illustrative purposes, the following description of process 1100 may refer to elements mentioned above in connection with FIGS. 1-6. In some embodiments, portions of the process 1100 may be performed by different elements of the system 500 such as: the receiver antenna 106, the sensor 504, the conformal reflective phased array antenna 506, the host antenna controller 516, etc. The process 1100 may have functions, material, and structures that are similar to the embodiments shown in FIG. 5. Therefore common features, functions, and elements may not be redundantly described here.

Process 1100 may begin by identifying at least one uncoated reflective surface that may cause interference by modeling the at least one uncoated reflective surface (task 1102). Initial identification of reflective surface(s) may be modeled by using a computer aided design (CAD) software tool or other computer modeling tool.

Process 1100 may continue by identifying feasible locations for creating a conformal reflective phased array antenna such as the conformal reflective phased array antenna 506 (task 1104). Feasible locations may comprise, for example but without limitation, a lift surface such a wing of the aircraft 108, a control surface such as a flap of the aircraft 108, or other location on a platform comprising an on-board receivers that may be subject to a co-site and/or a multipath interference.

Process 1100 may continue by simulating the feasible locations to determine effectiveness at reducing interference under reasonable signal scenarios to provide simulation results (task 1106). The reasonable signal scenarios may comprise, signals during normal operation conditions such as: navigation, surveillance, communication with a control tower, communication with a server on satellite or on a ground station, or other condition.

Process 1100 may continue by creating test conformal structures comprising the conformal reflective phased array antenna 506 coupled to at least one reflective-array-coated reflective surface such as the reflective-array-coated reflective surface 404 to verify the simulation results (task 1108). The at least one reflective-array-coated reflective surface may comprise at least one of the feasible locations.

Process 1100 may continue by creating conformal reflective array antenna structures at specified locations (task 1110). The specified locations may be determined based on the simulation results. The specified locations may comprise at least one of the feasible locations.

Process 1100 may continue by calibrating algorithms of a host antenna controller such as the host antenna controller 516 using external test signals and measuring the resulting interference reduction at a receiver antenna such as the receiver antenna 106 (task 1112).

In this manner, embodiments of the disclosure provide a conformal active reflective array system and methods to mitigate co-site or multipath interference signals interference with expected signals at on-board receivers on a platform. The conformal active reflective array system provided herein is lighter than the existing RF absorber option, and does not require repositioning antennas.

In this document, the terms "computer program product", "computer-readable medium", computer readable storage medium and the like may be used generally to refer to media such as, for example, memory, storage devices, or storage unit. These and other forms of computer-readable media may be involved in storing one or more instructions for use by the processor module 518 to cause the processor module 518 to perform specified operations. Such instructions, generally referred to as "computer program code" or "program code" (which may be grouped in the form of computer programs or other groupings), when executed, enable a method of co-site and multi-path interference mitigation of system 500.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1 and 3-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for co-site and multi-path interference mitigation, the method comprising:
   receiving a reflection signal from at least one aircraft surface at a sensor near a receiver antenna;
   sending signal characteristics of the reflection signal from the sensor to an antenna controller;
   configuring by control of the antenna controller a conformal reflective phased array antenna coupled to the at least one aircraft surface to steer the reflection signal;
   steering the reflection signal using the conformal reflective phased array antenna to reduce an amplitude of the reflection signal at the receiver antenna based on the reflection signal received at the sensor; and
   phase shifting the reflection signal based on a measured angle of arrival of the reflection signal at the sensor.

2. The method of claim 1, further comprising steering the reflection signal using the conformal reflective phased array antenna to direct a null of the reflection signal at the receiver antenna.

3. The method of claim 1, further comprising actively forming a plurality of radiation nulls directed at a specific on-board receiver to reduce a multipath interference signal from an off-board source.

4. The method of claim 1, further comprising reducing a co-site interference signal from an on-board source.

5. The method of claim 1, further comprising:
   computing angles of nulls of a nominal scatter field of the reflection signal;
   determining a closest null to an angle of the receiver antenna; and
   steering the reflection signal using the conformal reflective phased array antenna to direct the closest null onto the receiver antenna.

6. A co-site and multi-path interference mitigation system comprising:
   a receiver antenna;
   a sensor near the receiver antenna configured to receive a reflection signal from at least one aircraft surface;

a conformal reflective phased array antenna coupled to the at least one aircraft surface configured to steer the reflection signal; and a controller configured to steer the reflection signal using the conformal reflective phased array antenna to reduce an amplitude of the reflection signal at the receiver antenna based on the reflection signal received at the sensor, and configured to phase shift the reflection signal based on a measured angle of arrival of the reflection signal at the sensor.

7. The system of claim 6, wherein the controller is further configured to steer the reflection signal using the conformal reflective phased array antenna to reduce direct a null of the reflection signal at the receiver antenna.

8. The system of claim 6, wherein the conformal reflective phased array antenna comprises a plurality of varactor diodes.

9. The system of claim 8, wherein the conformal reflective phased array antenna comprises:
an antenna element; and
a phase shifter configured to change a phase of the antenna element in response to a command from the controller to steer the conformal reflective phased array antenna thereby steering the reflection signal.

10. A method for configuring a co-site and multi-path interference mitigation system, the method comprising:
positioning a sensor near a receiver antenna;
coupling a conformal reflective phased array antenna to at least one aircraft surface;
configuring a controller to receive from the sensor, signal characteristics of a reflection signal from the at least one aircraft surface;
configuring the conformal reflective phased array antenna to steer the reflection signal from the at least one aircraft surface under control of the controller;
configuring the sensor to receive the reflection signal; configuring the controller to steer the reflection signal using the conformal reflective phased array antenna to reduce an amplitude of the reflection signal at the receiver antenna based on the reflection signal received at the sensor; and
configuring the controller to phase shift the reflection signal based on a measured angle of arrival of the reflection signal at the sensor.

11. The method of claim 10, wherein the reflection signal comprises at least one of a co-site interference signal, and a multipath interference signal.

12. The method of claim 11, wherein steering the reflection signal further comprises attenuating at least one of the co-site interference signal, and the multipath interference signal.

13. The method of claim 10, further comprising forming the conformal reflective phased array antenna on the at least one aircraft surface via a direct write process.

14. The method of claim 10, wherein the conformal active reflect array comprises flexible substrate electronics.

15. A non-transitory computer readable storage medium comprising computer-executable instructions for performing co-site and multi-path interference mitigation, the computer-executable instructions comprising:
receiving a reflection signal from at least one aircraft surface at a sensor near a receiver antenna;
sending signal characteristics of the reflection signal from the sensor to an antenna controller:
configuring by control of the antenna controller a conformal reflective phased array antenna coupled to the at least one aircraft surface to steer the reflection signal;
steering the reflection signal using the conformal reflective phased array antenna to reduce an amplitude of the reflection signal at the receiver antenna; and
phase shifting the reflection signal based on a measured angle of arrival of the reflection signal at the sensor.

16. The computer readable storage medium of claim 15, the computer-executable instructions, further comprising steering the reflection signal using the conformal reflective phased array antenna to direct a null of the reflection signal at the receiver antenna.

17. The computer readable storage medium of claim 15, wherein the reflection signal comprises at least one of: a co-site interference signal, and a multipath interference signal.

18. The computer readable storage medium of claim 17, wherein steering the reflection signal further comprises attenuating at least one of the co-site interference signal, and the multipath interference signal.

19. The computer readable storage medium of claim 15, the conformal reflective phased array antenna is coupled to the at least one aircraft surface via a direct write process.

20. The computer readable storage medium of claim 15, wherein the conformal reflective phased array antenna comprises flexible substrate electronics.

21. A method for space-time-adaptive-processing for actively forming and directing a radiation null at an on-board receiver to reduce a multipath interference signal from an off-board source, the method comprising:
computing by a processor angles of nulls of a nominal scatter field of a reflection signal from a broadside of a conformal reflective phased array antenna;
determining by the processor a closest null to an angle of a receiver antenna with respect to the broadside of the conformal reflective phased array antenna; and
steering by the processor the reflection signal using the conformal reflective phased array antenna to direct the closest null onto the receiver antenna, wherein a phase of an antenna element of the conformal reflective phased array antenna is changed in response to a command from a controller to steer the conformal reflective phased array antenna thereby steering the reflection signal.

22. The method of claim 21, further comprising receiving by the processor the reflection signal from at least one aircraft surface at a sensor near the receiver antenna.

23. The method of claim 22, further comprising determining by the processor the angle of the receiver antenna based on a measured angle of arrival of the reflection signal at the sensor.

24. The method of claim 23, further comprising measuring measured signals at the sensor and estimating by the processor the angles of nulls of the reflection signal based on the measured signals.

25. The method of claim 21, wherein determining the closest null further comprises comparing the angles of nulls to the angle of the receiver antenna.

26. The method of claim 21, further comprising coupling the conformal reflective phased array antenna to at least one aircraft surface.

27. The method of claim 26, further comprising coupling the conformal reflective phased array antenna to the at least one aircraft surface via a direct write process.

28. A non-transitory computer readable storage medium comprising computer-executable instructions for performing space-time-adaptive-processing for actively forming and directing a radiation null at an on-board receiver to reduce a multipath interference signal from an off-board source, the computer-executable instructions comprising:

computing angles of nulls of a nominal scatter field of a reflection signal from a broadside of a conformal reflective phased array antenna;

determining a closest null to an angle of a receiver antenna with respect to the broadside of the conformal reflective phased array antenna; and steering the reflection signal using the conformal reflective phased array antenna to direct the closest null onto the receiver antenna based on the angle of the receiver antenna, wherein a phase of an antenna element of the conformal reflective phased array antenna is changed in response to a command from a controller to steer the conformal reflective phased array antenna thereby steering the reflection signal.

29. The computer readable storage medium of claim 28, further comprising computer-executable instructions for receiving the reflection signal from at least one aircraft surface at a sensor near the receiver antenna.

30. The computer readable storage medium of claim 29, further comprising computer-executable instructions for determining the angle of the receiver antenna based on a measured angle of arrival of the reflection signal at the sensor.

31. The computer readable storage medium of claim 28, wherein the conformal reflective phased array antenna is coupled to at least one aircraft surface.

32. The computer readable storage medium of claim 31, wherein the conformal reflective phased array antenna is coupled to the at least one aircraft surface via a direct write process.

* * * * *